Patented Mar. 25, 1941

2,235,926

UNITED STATES PATENT OFFICE 2,235,926

GREASE

Torsten Hasselstrom, Savannah, Ga., assignor to G & A Laboratories, Inc., Savannah, Ga., a corporation of Georgia No Drawing. Original application September 29, 1937, Serial No. 166,443. Divided and this application December 2, 1939, Serial No. 307,281

3 Claims. (Cl. 252—32)

This invention relates to an improved grease and more particularly to a grease containing a non-crystalline resin product as a setting agent.

Broadly speaking, the grease prepared in accordance with my invention contains as the setting agent the crude, non-crystalline, brownish insoluble product obtained by treating a mixture of dehydrogenated and hydrogenated rosin with concentrated sulfuric acid and removing the sulfonic acid by aqueous extraction.

As a suitable mixture of dehydrogenated and hydrogenated rosin I may use the resin known to the trade as Hyex resin and prepared in accordance with the process disclosed in United States Patent No. 2,154,629 of April 18, 1939, to Edwin R. Littmann entitled "Process for the treatment of abietyl compounds and products produced thereby."

Said Patent No. 2,154,629 discloses the treatment of compounds containing the hydrocarbon nucleus of abietic acid so as to decrease their apparent unsaturated character, and possibly increase their melting points and improve their color, and also relates to the treated products so formed. Said treatment comprises contacting the abietyl compound with a catalyst of the type hereinafter described, in a manner adapted to exclude the possibility of reaction between the abietyl compound and any other material. As a result of such treatment, a change in the chemical and physical properties of the abietyl compound, believed to be due to a simultaneous dehydrogenation and hydrogenation by the heating of the abietyl compound in the presence of the hydrogenation catalyst only, e. g. palladium takes place, and the resulting product will be found to have a greatly decreased apparent color.

The catalysts which may be used in effecting this change or intra- or inter-molecular rearrangement are those which catalyze the hydrogenation of unsaturated organic compounds, for example, any of the nickel, platinum, palladium or copper chromite catalysts used in such hydrogenation. Preferably, a palladium catalyst will be employed in the method according to this invention, for example, a catalyst comprising 40% by weight of palladium supported on fibrous asbestos.

Desirably, the abietyl compound and the catalyst will be brought into contact at an elevated temperature, in order that a practical reaction rate may be obtained, but the use of an elevated temperature is not necessary for the accomplishment of the desired results. The optimum temperature range for the most satisfactory results is from about 150° C. to about 250° C. Since thorough contact between catalyst and abietyl compound can best be obtained when the abietyl compound is in liquid or vapor phase, the abietyl compound, when not a liquid at the temperature employed, will be heated to render it liquid.

It is essential that the treatment of the abietyl compound be carried out in such a manner that no reaction can occur between the abietyl compound and any other material. No added hydrogen is present during the treatment. While the treatment may be carried out in the presence of air, it is preferable to treat the abietyl compound in an atmosphere of more inert gas, for example, carbon dioxide, nitrogen, etc.

The following table shows comparative values of various chemical constants for treated and untreated abietyl compounds:

|  | "I" rosin, before treatment | "I" rosin, after treatment |
|---|---|---|
| Thiocyanate number | 90–96 | 10–14. |
| Melting point, drop method °C. | 80–85 | 85–90. |
| Color |  | Slightly bleached. |
| Saponification number | 168–172 | 167–171. |
| Oxygen absorption, percent of total absorbed by 2 double bonds, percent | 40 | 1. |

The decrease in the thiocyanate number and in oxygen absorption exhibited by the treated "I" rosin is proof of the marked decrease in apparent chemical unsaturation produced by treatment in accordance with this invention. The fact that the saponification number is practically the same for both treated and untreated rosins is proof that the carboxyl groups of the rosin acids have been unchanged by the treatment, which must, therefore, affect the hydrocarbon nucleus only.

More specifically, my invention comprises the sulfonation by treatment by concentrated sulfuric acid of wood or gum rosin which has been simultaneously dehydrogenated and hydrogenated by heating in the presence of a hydrogenation catalyst, e. g. palladium, in accordance with the process disclosed in Patent No. 2,154,629, and if desired sulfonation of the resin dissolved in a solvent therefor which is unattacked or attacked by the sulfuric acid, e. g. carbon tetrachloride, liquid sulfur dioxide, petroleum distillate, or unsaturated hydrocarbons and/or alcohols of the aliphatic, alicyclic and/or aromatic type.

As sulfonating agent I preferably employ sulfuric acid of specific gravity about 1.84, although I may employ somewhat lower strengths of sulfuric acid or somewhat higher strengths, even to fuming sulfuric acid or sulfur trioxide, but at the slight disadvantage of reduced yields of monosulfonic acids, because of side reactions and/or formation of disulfonic acids or mixtures thereof. I may also employ, if desired, chlorosulfonic acid as my sulfonating agent.

*Example I*

As an example of the carrying out of my process, 100 g. of the Hyex resin described above were finely pulverized and added gradually to 200 cc. of sulfuric acid of specific gravity 1.84 at a temperature of 10° C. with vigorous stirring. The temperature of the mixture rose to 37° C., but there was no evolution of sulfur dioxide. Sulfonation was complete in 45 minutes, and the temperature dropped to 5° C., due to the surrounding ice bath used. The mixture was then poured into ice and the nearly colorless precipitate collected, washed with cold water until the washings clouded when mixed with the original mother liquor. The washed precipitate was extracted once with boiling water. There remained a brownish, insoluble precipitate. The hot aqueous extract, on cooling, separated the sulfonic acid, having a melting point of 221–4° C. (with decomposition) or when recrystallized from glacial acetic acid having a melting point of 223–4° C. (with decomposition), $[\alpha]_D = +71.72$, in a yield of 50 g. The yield of the brownish, insoluble product was 47 g. This insoluble product may be used as a grease-setting agent, or, after removal of acid bodies by digestion with aqueous alkali, and crystallization of the residue from acetone, yields a solid melting at 131.5° C. to 132° C. From the alkaline extracts of the brownish, insoluble product, an additional 10–20% or more of Hyex sulfonic acid can be recovered by acidification. The non-crystalline material, remaining after the removal of these crystalline constituents, I have found to be useful, after refining, e. g. by fractional distillation, as a superior rosin oil in the manufacture of printers' ink, plasticizers, and the like.

*Example II*

In a further example of the carrying out of my invention, 10 g. of the Hyex resin acid obtained by fractional crystallization of Hyex resin, and having a melting point of about 156–158° C. and an optical rotation $[\alpha]_D$ of about $+43.83$, was sulfonated at 10 to 15° C. with 75 cc. of 95% sulfuric acid in a period of 30 minutes, with vigorous stirring. The pale orange solution resulting was poured into ice water, the precipitate collected, washed with cold water, extracted twice with boiling water, leaving about 2 g. of insoluble material. The combined aqueous extracts, on acidification by 10 cc. of concentrated hydrochloric acid, precipitated 7.2 g. of a sulfonic acid melting at 220–3° C. (with decomposition) $[\alpha]_D = +61.33°$, recrystallized from glacial acetic acid, melting at 223–224.5° C. (with decomposition).

*Example III*

In a further example of the carrying out of my invention, 100 g. of distilled Hyex resin, previously described, was dissolved in 100 cc. of carbon tetrachloride and sulfonated at 30° C.–35° C. by 70 cc. of 95% sulfuric acid, the acid being added gradually with vigorous stirring during a period of 45 minutes. The mixture was then poured into 2 liters of water, the mass refluxed for about 10 minutes, and the two layers separated while still warm. The carbon tetrachloride layer was again extracted with water by refluxing. The yield of sulfonic acid obtained from the aqueous extracts was 35%. Evaporation of the carbon tetrachloride layers left a light colored resin similar to the raw material treated.

My sulfonic acid product will be found variously adaptable to uses as an improved detergent and wetting out agent, e. g. in the scouring of textiles, as a soap assistant, etc.

I may prepare the neutral or acid alkali or alkaline earth, or organic base, e. g. ethanolamine, salts of my sulfonic acid product, and such also are variously adaptable to uses as improved detergents and wetting out agents.

The non-crystalline, brownish material separated from the sulfonic acid, as shown, for example, in Examples I and II, I have found useful as a grease-setting and/or emulsifying agent, e. g. in the manufacture of cup grease, solid oils, and the like.

*Example IV*

As an example of carrying out my process of making a cold set grease, the non-crystalline, brownish material separated from the sulfonic acid, as shown, for example, in Examples I and II, was dried to about constant weight. Seven and one-half grams of this dried material was dissolved at about 130° C. in 22.5 g. of mineral oil of about 100 sec. viscosity (Saybolt) at 100° F., after cooling, the solution was saponified at room temperature, of about 25° C., with 70 g. of mineral oil, 100 sec. viscosity (Saybolt) at 100° F., containing 25% of suspended calcium hydroxide and stirred for about 10 sec. to about 2 minutes to form a grease.

This application is a division of my application, Serial No. 166,443 for Detergent and wetting agent and process of producing the same, filed by me September 29, 1937, which is in turn a continuation-in-part of my application, Serial No. 70,672, filed by me March 24, 1936, and now issued as Patent 2,121,033 of June 21, 1938.

What I claim and desire to protect by Letters Patent is:

1. A grease including as a setting agent the crude, non-crystalline, brownish insoluble product obtained by treating a mixture of dehydrogenated and hydrogenated rosin with concentrated sulfuric acid under conditions which promote sulfonation and removing the sulfonic acid by aqueous extraction.

2. A grease including as a setting agent the crude, non-crystalline, brownish insoluble product obtained by treating a resin prepared by heat-treating rosin in the presence of a hyrogenation catalyst and in the absence of added substances capable of reducing the degree of unsaturation of the rosin, with concentrated sulfuric acid under conditions which promote sulfonation and removing the sulfonic acid by aqueous extraction.

3. A cup grease including mineral oil and as a setting agent the crude, non-crystalline, brownish insoluble product obtained by treating a resin prepared by heat-treating rosin in the presence of a hydrogenation catalyst and in the absence of added substances capable of reducing the degree of unsaturation of the rosin, with concentrated sulfuric acid under conditions which promote sulfonation and removing the sulfonic acid by aqueous extraction.

TORSTEN HASSELSTROM.